United States Patent [19]

Cockram et al.

[11] 4,293,575

[45] Oct. 6, 1981

[54] METHOD AND APPARATUS FOR TEXTURIZING A PROTEINACEOUS SUBSTANCE

[75] Inventors: Geoffrey N. Cockram, Henley on Thamas; Jeffrey E. Munden, High Wycombe, both of England

[73] Assignee: E. I. Du Pont de Nemours and Company, Wilmington, Del.

[21] Appl. No.: 108,841

[22] Filed: Dec. 31, 1979

Related U.S. Application Data

[63] Continuation of Ser. No. 889,041, Mar. 22, 1978, abandoned, which is a continuation of Ser. No. 694,989, Jun. 11, 1976, abandoned.

[30] Foreign Application Priority Data

Jun. 13, 1975 [GB] United Kingdom ............... 25387/75

[51] Int. Cl.$^3$ ........................... A23J 3/00; A23L 1/28
[52] U.S. Cl. .................................. 426/104; 426/656; 426/516; 426/802
[58] Field of Search ............... 426/104, 656, 516, 517, 426/802

[56] References Cited

U.S. PATENT DOCUMENTS

| | | | |
|---|---|---|---|
| 2,640,033 | 5/1953 | Marshall | 99/452 |
| 3,775,393 | 11/1973 | Akin et al. | 426/656 |
| 3,870,805 | 3/1975 | Hayes et al. | 426/516 X |
| 3,937,693 | 2/1976 | Towersey et al. | 426/656 X |
| 3,939,284 | 2/1976 | Akin et al. | 426/656 X |
| 3,970,761 | 7/1976 | Wenger et al. | 426/656 X |

FOREIGN PATENT DOCUMENTS

1346062 5/1971 United Kingdom .

OTHER PUBLICATIONS

Humphrey, *Single Cell Protein II*, The MIT Press, Cambridge, Mass., 1975, pp. 12 and 22.

*Primary Examiner*—Esther M. Kepplinger

[57] ABSTRACT

A process of texturizing a mycelial fungal mass and resultant product is disclosed. The fungal mycelial mass containing 20% to 35% and preferably 23% to 33% solids in water is extruded through a die containing a foraminous member and a compression zone whereby a meat-like material is obtained.

8 Claims, 4 Drawing Figures

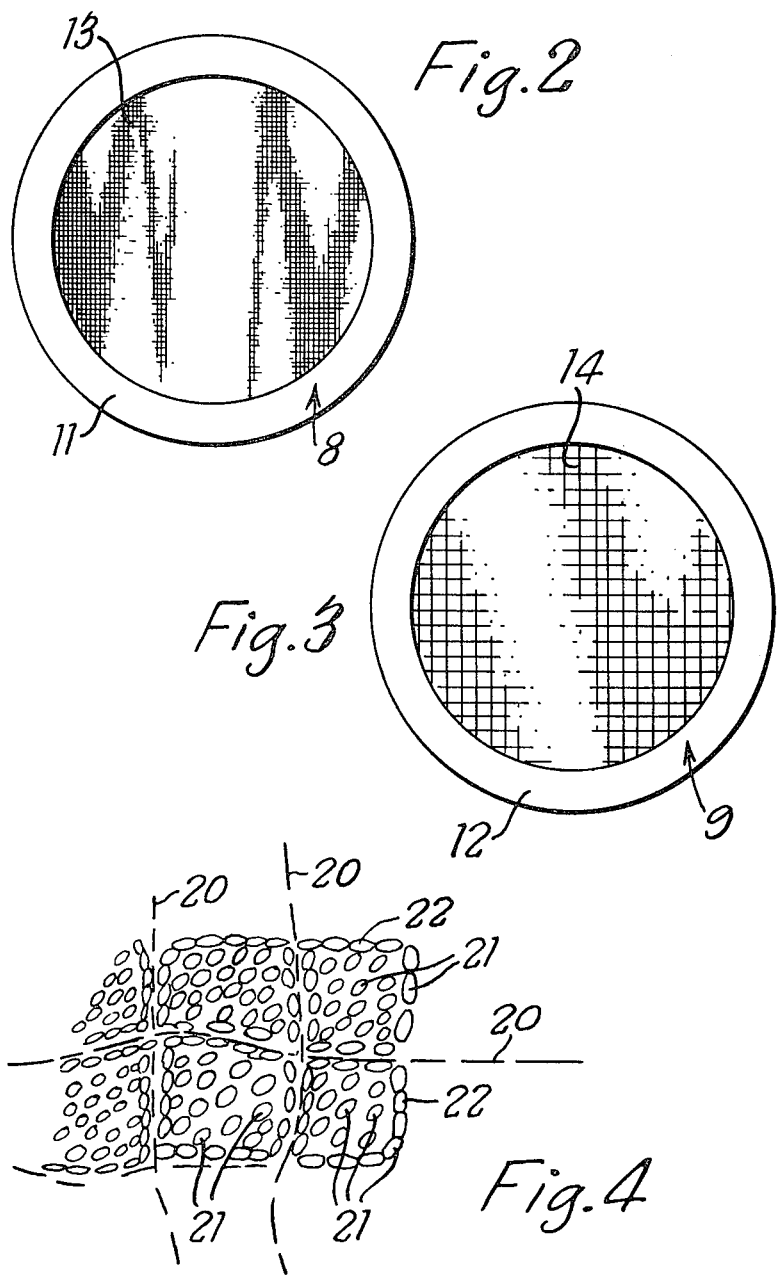

METHOD AND APPARATUS FOR TEXTURIZING A PROTEINACEOUS SUBSTANCE

This is a continuation of application Ser. No. 889,041, filed Mar. 22, 1978 now abandoned, which in turn is a continuation of application Ser. No. 694,989, filed June 11, 1976 now abandoned.

This invention relates to a method and apparatus for texturising a mycelial fungal mass for use as a foodstuff.

Existing methods of working an amorphous mass of proteinaceous substance, for example, a mass derived from soya or from cereals or other vegetable sources, are well known and are employed in an attempt to provide a sufficient degree of texturising to make the substance readily acceptable as a foodstuff for humans.

Texturising extrusion techniques have been employed and in a conventional extruder the paste-like amorphous mass is forced through a die-head by a positive displacement pump or by an extruder screw rotating inside a close fitting tube or cylinder. The die-head usually consists of one or more round holes through which the mass is forced under pressure. The resulting extruded material is essentially the same shape in cross-section as the hole or holes in the die-head. The shapes and structure produced by this type of extrusion are of uniform texture.

Mycelial fungi grown under controlled conditions in a fermenter are also a source of protein and it is to the texturising of mycelial fungi with the particular aim of simulating meat that the present invention is concerned. Non-toxic fungal mycelium particularly suitable are those disclosed in United Kingdom Patent Specification Nos. 1331472 and 1346062 the fermentation product having been reduced in turgor, suitably by a reduction in the ribonucleic acid level.

It is the main objective of this invention to provide a method and apparatus for texturising a mycelial fungal mass so as to give to the mass a texture which is analogous to the texture of meat.

According to the present invention there is provided a method of texturising a mycelial fungal mass having reduced turgor and a solids content of between 20% and 35% by weight, which includes passing the mass under pressure through at least one apertured member whereby the mass is filamented and compacting said filaments to form a textured structure. Preferably the mass is passed in succession through a plurality of meshes each having a different mesh size.

The invention also includes apparatus for texturising a mycelial fungal mass having reduced turgor and a solids content of between 20% and 35% by weight, which includes means for feeding the mass to a die, at least one apertured member within the die through which the mass is passed to effect filamenting of the mass and compacting means for reducing the cross-sectional size of the filamented mass to produce a textured structure.

Conveniently, the feeding means may include a screwtype positive displacement pump located within a housing attached to a die and operated at ambient temperature. The die may incorporate two mesh structures, the first mesh structure being of a fine nature and the second mesh structure being of a more coarse nature and a compacting head, having an internal taper, attached near to the outlet from the second mesh structure.

The invention further includes a textured mycelial fungal mass composed of axially parallel filaments substantially all of which have in the plane of lateral cross-section dimensions which lie normal to each other of substantially equal length, groups of filaments being each joined to adjacent groups of filaments at planes of discontinuity, some of said planes lying parallel to each other and all of said planes lying parallel to the general direction of the axes of the filaments.

In order to illustrate the invention one embodiment thereof will now be described, by way of example only, and with reference to the accompanying drawings, in which:

FIG. 2 is a cross-section on a line II—II of FIG. 1;

FIG. 3 is a cross-section on the line III—III of FIG. 1; and

FIG. 4 is a diagrammatic representation of a lateral cross-section through a textured mycelial fungal mass in accordance with the invention.

Figure 1:
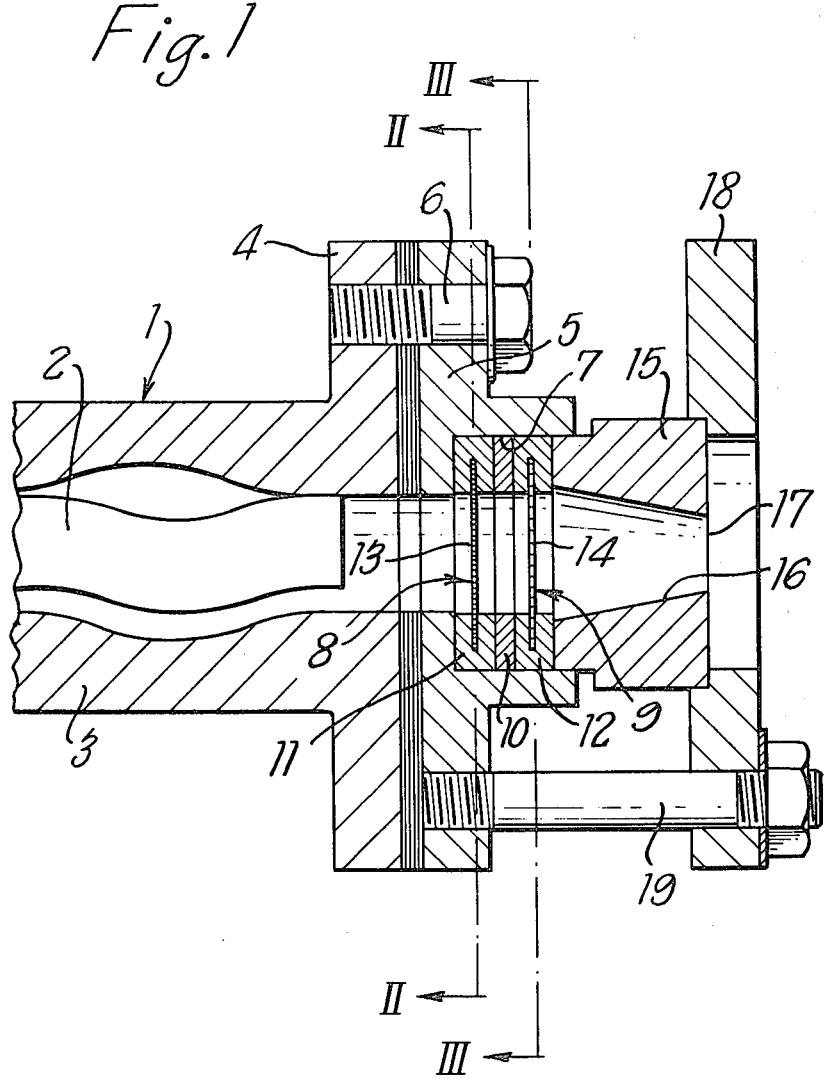
FIG. 1 is a cross-sectional view through apparatus constructed in accordance with the invention.

Referring to the drawings, the apparatus includes a positive displacement pump 1 of the floating screw rotor type feeding a mycelial fungal mass under pressure with the range 100 to 200 p.s.i. or even up to 15 atmospheres. The preferable starting materials are those mentioned in the above United Kingdom Patent Specifications the product of the fermenter having had its ribonucleic acid level reduced about ten-fold although a reduction of less than this will provide adequate loss of turgor. The reduction in the ribonucleic acid level may be achieved in accordance with the disclosures in United Kingdom Patent Specification Nos. 1,408,845 or 1,440,642. The most significant result of the loss of ribonucleic acid for structuring purposes is the loss of turgor in the mass. Turgor is simply the normal hydraulic pressure in the cell which contains about 80 to 90% water.

The pump 1 includes a rotor 2 and a stator 3 provided with a flange 4 attached to a housing 5 by bolts 6. The housing 5 has a cylindrical recess 7 within which is located two mesh structures 8 and 9 spaced an appropriate distance by a spacer 10. The mesh structures 8 and 9 are more particularly shown in FIGS. 2 and 3 and comprise a metal ring 11 and 12 respectively carrying metal or plastics meshes 13 and 14 respectively.

The mesh structures 8 and 9 are held in position within the recess 7 by the compacting means in the form of a block 15 having a tapered bore 16 terminating in an outlet 17. The block 15 is held in position by a plate 18 attached to the housing 5 by bolts 19.

Metal meshes 13 and 14 of varying sizes may be used dependent upon the nature of the product to be produced. Indeed only one such mesh may be employed and the mesh size may lie within the range 0.3 to 2.0 mm and preferably 0.6 mm. Two similar meshes may be used and the optimum mesh size in this case is 0.6 mm. If two meshes of different sizes are used then it is preferable to pass the mass through the finer mesh first. sizes should be within the range 1:1 to 1:7.

The method of the invention is preferably carried out at ambient temperature although action of the pump will raise the temperature of the mass slightly.

In the illustrated embodiment, when the mass is first passed through the fine mesh 13, the mass is urged to form filaments approximately equal in size to the size of the mesh and these filaments are axially parallel. Substantially all of these filaments have in lateral cross-section dimensions which lie normal to each other in the plane of the cross-section of substantially equal length i.e., the filaments are of a shape in lateral cross-section between circular and square.

On leaving the first mesh 13 there is a tendency for the filaments to be recompressed into a contiguous mass due to the back pressure between the meshes 13 and 14. The further extrusion of the mass through the coarser mesh 14 breaks up the previously formed filaments into strands which are made up of small groups of filaments with planes of discontinuity in the final mass traversing the plane of lateral cross-section of the extrusion. These planes of discontinuity are illustrated in FIG. 4 at 20. The filaments are indicated at 21 and the border filaments 22 in each group of filaments are flattened normal to the adjacent plane of discontinuity.

The mass after filamenting is then passed through a compacting means 15 to form a contiguous mass of product of a textured nature. A mycelial fungal mass is made up of groups of hyphae in random order. Passing the filamented mass through compacting means has the effect of attenuating the groups and aligning them axially along the direction of extrusion through the die. Investigations have shown that a die with a 4:1 reduction in cross-sectional area and 15° from parellel walls produces optimum results. However, the die design may vary with different raw materials. It is thought that a 4:1 reduction in cross-sectional area is to be preferred but this reduction in cross-sectional area may lie between 1:2 to 1:10. A 1:4 reduction is suitable for a square extrudate of ½" sides.

The extrusion speed may be 28" per minute although this may vary considerably and extrusion speeds in excess of 2,000" per minute may be possible.

It has been found that there is an optimum solids content for the basic raw material so as to make it suitable for extrusion in accordance with the invention. The optimum solids content is found to be between 23 and 33% by weight although within the range 20% to 35% by weight gives a worthwhile product.

After emerging from the outlet 17 the product will be further processed for use as a foodstuff. An extrudate ½" square may be dried and cut into chunks. With larger extrusion of, for example, a cross-sectional area of 1½"×2½" these may be sliced by a knife or torn into slices or strips or cut into chunks following drying.

The mesh or meshes referred to above may be replaced by equivalent means, for example, one or more plates drilled or otherwise provided with a network of apertures. In this way a tow of similar but separate filaments is produced.

The product of the present invention has a texture analogous to the texture of meat, fish or other conventional textured foodstuffs.

What we claim is:

1. A method of texturizing a mass consisting essentially of fungal mycelia having reduced turgor and a solids content of between 20% and 35% by weight, consisting solely of the steps of passing the mass under pressure through at least one member containing a plurality of apertures whereby the mass is filamented and compacting the resulting filaments to form a textured structure.

2. The method as claimed in claim 1, in which the mass is passed in succession through a plurality of meshes.

3. The method as claimed in claim 2, in which the meshes have a different mesh size.

4. The method as claimed in claim 3, in which the mass is passed through two meshes, the upstream mesh having a smaller mesh size than the downstream mesh.

5. The method as claimed in claim 2 in which the mass is heated by shear action prior to passing through the mesh or meshes.

6. The method as claimed in claim 2, in which the mass is fed to the mesh or meshes under pressure within the range 100 to 200 p.s.i.

7. A mycelial mass having a texture analogous to the texture of meat or fish prepared by the method of claim 1.

8. The process of claim 1 wherein the process is carried out at ambient temperature.

* * * * *